United States Patent
Van Gheem et al.

(10) Patent No.: US 12,244,985 B2
(45) Date of Patent: Mar. 4, 2025

(54) CONTROLLER WITH NETWORK MODE AND DIRECT MODE

(71) Applicant: Shure Acquisition Holdings, Inc., Niles, IL (US)

(72) Inventors: Steve Van Gheem, Gilberts, IL (US); Bryan Jozwiak, Bartlett, IL (US); Jon Halverson, Des Plaines, IL (US); Brian Buhman, Chicago, IL (US); Jonathan Portwood, Vernon Hills, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/145,176

(22) Filed: Dec. 22, 2022

(65) Prior Publication Data

US 2023/0119258 A1    Apr. 20, 2023

Related U.S. Application Data

(63) Continuation of application No. 17/104,966, filed on Nov. 25, 2020, now Pat. No. 11,564,024.

(60) Provisional application No. 62/941,085, filed on Nov. 27, 2019.

(51) Int. Cl.
| | | |
|---|---|---|
| H04R 1/10 | (2006.01) | |
| H04L 67/12 | (2022.01) | |
| H04R 1/08 | (2006.01) | |
| H04W 36/00 | (2009.01) | |

(52) U.S. Cl.
CPC ............... *H04R 1/08* (2013.01); *H04L 67/12* (2013.01); *H04R 1/1041* (2013.01); *H04W 36/033* (2023.05); *H04R 2420/07* (2013.01)

(58) Field of Classification Search
CPC ..... H04R 1/08; H04R 2420/07; H04R 1/1041
USPC .................................... 381/77–81, 104, 109
See application file for complete search history.

(56) References Cited

U.S. PATENT DOCUMENTS

| | | |
|---|---|---|
| 4,145,683 A | 3/1979 | Brookhart |
| 4,808,992 A | 2/1989 | Beyers, Jr. et al. |
| 5,692,057 A | 11/1997 | Grad et al. |
| 6,349,283 B1 | 2/2002 | Sanders |
| 6,477,361 B1 | 11/2002 | LaGrotta et al. |

(Continued)

FOREIGN PATENT DOCUMENTS

| | | |
|---|---|---|
| EP | 1061708 A3 | 3/2004 |
| EP | 2493253 A1 | 8/2012 |

(Continued)

OTHER PUBLICATIONS

Apr. 13, 2021—(WO) International Search Report and Written Opinion Appn PCT/US2020/062338.

(Continued)

*Primary Examiner* — Disler Paul
(74) *Attorney, Agent, or Firm* — Banner & Witcoff, Ltd.

(57) ABSTRACT

A controller in a wireless system that may switch between two modes. In a first mode, the controller communicates directly with a wireless transceiver, using a first wireless protocol, and receives audio signal directly from the wireless transceiver, using a second wireless protocol. In a second mode, the controller communicates with a wireless transceiver via a wireless access point, using the first wireless protocol, and receives audio signal from the wireless transceiver via a wireless access point, using the second wireless protocol.

20 Claims, 5 Drawing Sheets

(56) References Cited

U.S. PATENT DOCUMENTS

| | | | |
|---|---|---|---|
| 6,762,788 | B2 | 7/2004 | Chang |
| 7,119,832 | B2 | 10/2006 | Blanco et al. |
| 7,155,242 | B1 | 12/2006 | MacKenzie et al. |
| 7,864,937 | B2 | 1/2011 | Bathurst et al. |
| RE43,872 | E | 12/2012 | Trip et al. |
| 8,325,911 | B2 | 12/2012 | Lambert |
| 8,385,814 | B2 | 2/2013 | Sanders et al. |
| 8,406,415 | B1 | 3/2013 | Lambert |
| 8,811,375 | B2 | 8/2014 | Gha et al. |
| 8,842,854 | B1 | 9/2014 | Sanders et al. |
| 9,094,636 | B1 | 7/2015 | Sanders et al. |
| 9,247,355 | B2 | 1/2016 | El-Hoiydi |
| 9,325,285 | B2 | 4/2016 | Feldt et al. |
| 9,336,307 | B2 | 5/2016 | Sanders et al. |
| 9,351,063 | B2 | 5/2016 | Burciu |
| 9,406,224 | B1 | 8/2016 | Sanders et al. |
| 9,432,624 | B2 | 8/2016 | Maurice |
| 9,621,224 | B2 | 4/2017 | Babarskas et al. |
| 9,807,408 | B2 | 10/2017 | Maurice |
| 9,911,433 | B2 | 3/2018 | Elliot et al. |
| 9,936,108 | B2 | 4/2018 | Menke et al. |
| 10,141,494 | B2 | 11/2018 | Kuhtz et al. |
| 10,230,342 | B1 | 3/2019 | Sanders et al. |
| 10,276,207 | B1 | 4/2019 | Sanders et al. |
| 10,305,951 | B1 | 5/2019 | Jorgovanovic |
| 10,362,379 | B2 | 7/2019 | Georgi et al. |
| 10,609,464 | B2 | 3/2020 | Georgi et al. |
| 10,686,897 | B2 | 6/2020 | Werner et al. |
| 10,802,791 | B2 * | 10/2020 | Patil .................. G06F 3/165 |
| 10,827,253 | B2 | 11/2020 | Boetcher et al. |
| 10,848,850 | B2 * | 11/2020 | Koss .................. H04R 1/1041 |
| 10,901,680 | B1 | 1/2021 | Sanders et al. |
| 10,951,747 | B2 | 3/2021 | Black |
| 10,959,011 | B2 * | 3/2021 | Koss .................. H04R 3/00 |
| 2002/0103919 | A1 | 8/2002 | Hannaway |
| 2002/0106986 | A1 | 8/2002 | Asada et al. |
| 2003/0103766 | A1 | 6/2003 | Sugahara et al. |
| 2003/0164084 | A1 | 9/2003 | Redmann et al. |
| 2003/0191634 | A1 | 10/2003 | Thomas |
| 2004/0242224 | A1 | 12/2004 | Janik et al. |
| 2005/0130717 | A1 | 6/2005 | Gosieski et al. |
| 2007/0099591 | A1 | 5/2007 | Hendrix et al. |
| 2009/0061798 | A1 | 3/2009 | Rofougaran et al. |
| 2009/0061800 | A1 | 3/2009 | Rofougaran et al. |
| 2009/0077401 | A1 | 3/2009 | Tsai |
| 2009/0180579 | A1 | 7/2009 | Ellis |
| 2009/0207247 | A1 | 8/2009 | Zampieron et al. |
| 2010/0119099 | A1 | 5/2010 | Haupt et al. |
| 2011/0211524 | A1 | 9/2011 | Holmes et al. |
| 2011/0269463 | A1 | 11/2011 | Wang et al. |
| 2015/0036835 | A1 * | 2/2015 | Chen .................. H04R 1/1041 381/74 |
| 2016/0134742 | A1 | 5/2016 | Shennib |
| 2017/0251440 | A1 * | 8/2017 | Gilson ................ H04W 52/028 |
| 2018/0063802 | A1 | 3/2018 | Kashef et al. |
| 2019/0312843 | A1 | 10/2019 | Grimm et al. |
| 2019/0356718 | A1 | 11/2019 | Haustein et al. |
| 2019/0356980 | A1 | 11/2019 | Koss et al. |
| 2020/0154203 | A1 | 5/2020 | Matthias et al. |

FOREIGN PATENT DOCUMENTS

| | | |
|---|---|---|
| EP | 3376771 A1 | 9/2018 |
| WO | 07052269 A2 | 5/2007 |
| WO | 2011085073 A1 | 7/2011 |
| WO | 2014150018 A2 | 9/2014 |
| WO | 2018168200 A1 | 9/2018 |

OTHER PUBLICATIONS

Apr. 13, 2021—(WO) International Search Report and Written Opinion—App PCT/US20/62338.

Mar. 11, 2024—(GB) Examination Report—App. No. GB2206254.1.

Jul. 19, 2024—(GB) Notice of Allowance—App. No. GB2206254.1.

\* cited by examiner

CONTROLLER WITH NETWORK MODE AND DIRECT MODE

CROSS-REFERENCE TO RELATED APPLICATIONS

This application is a continuation of U.S. patent application Ser. No. 17/104,966 filed Nov. 25, 2020, which claims the benefit of and priority to co-pending U.S. Provisional Patent Application Ser. No. 62/941,085, filed Nov. 27, 2019, and entitled "Controller with Network Mode and Direct Mode," the contents of which is incorporated herein by reference in its entirety for all purposes.

BACKGROUND

Wireless microphones, and other wireless transmitters of audio signals, are commonly used at sporting or entertainment events to allow their users, such as performers and reporters, to have mobility, without concern for the limitations of cabling, as commonly experienced with wired systems. Some currently available wireless microphones are configurable via a wireless communication link with an access point. However, these current systems require that a controller communicate the configuration information to the wireless access point via a wired network connection.

A drawback of these existing systems is that the controller, having the wired network connection with the wireless access point, lacks mobility. In addition, the existence of the wired network causes complexity in the setup of a system including configurable wireless microphones.

SUMMARY

The following summary presents a simplified summary of certain features. The summary is not an extensive overview and is not intended to identify key or critical elements.

According to some aspects, a controller in a wireless system may, in a first mode, communicate directly with a wireless microphone, via a first wireless protocol, in order to control or configure the wireless microphone, and may, in a second mode, communicate using the first wireless protocol with a wireless access point, in order to control or configure the wireless microphone.

According to further aspects, the controller may automatically switch between the first mode and the second mode, for example, to change modes when communications via a selected one of the first mode or the second mode is not available, or becomes unavailable or unreliable.

According to further aspects, a method may enable an unregistered device, such as a spare wireless microphone, to join a wireless network and become a registered device.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
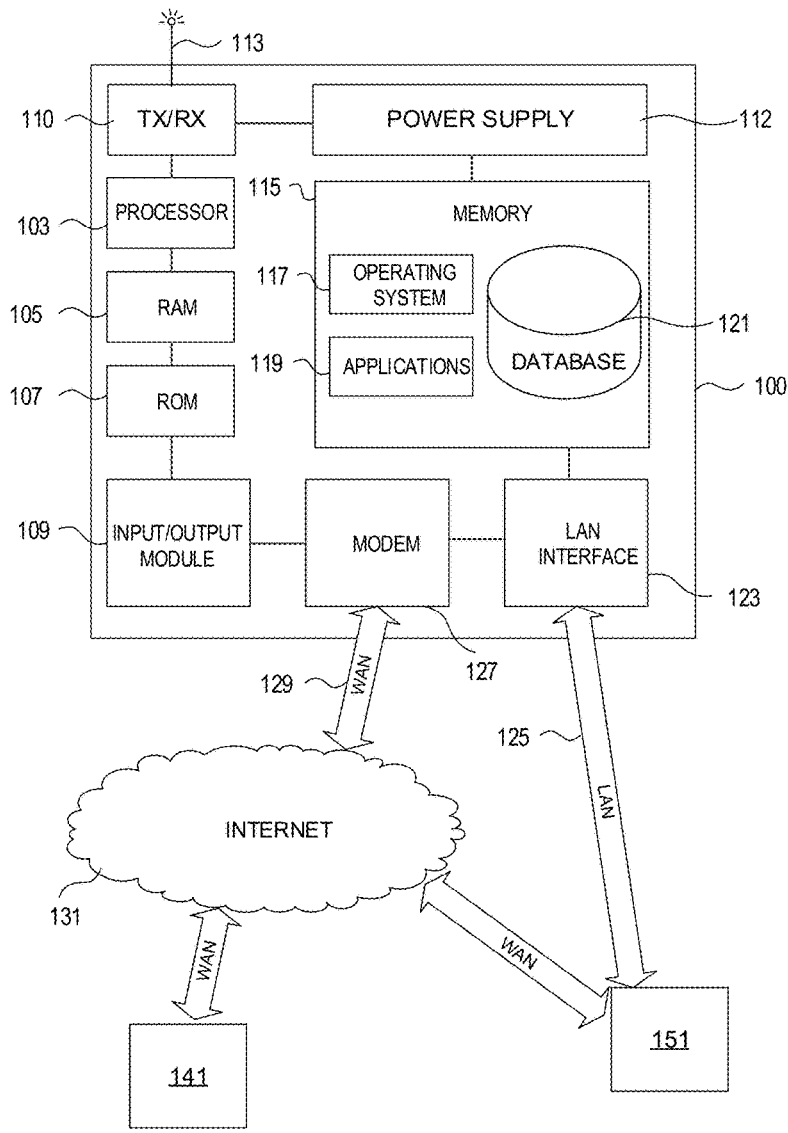
FIG. 1 schematically depicts one embodiment of a computing device capable of functioning as a controller, according to aspects of the disclosure.

The accompanying drawings, which form a part hereof, show examples of the disclosure. It is to be understood that the examples shown in the drawings and/or discussed herein are non-exclusive and that there are other examples of how the disclosure may be practiced.

FIG. 1 illustrates a block diagram of an example computing device 100 in accordance with aspects described herein. Computing device 100 may include hardware, firmware, and software utilized to process, modify, transmit, store, convert, or otherwise take actions with respect to controlling and/or configuring various wireless devices and for receiving audio signals from these wireless devices, as well as for performing other functions. The computing device 100 may communicate with one or more connected computer devices, such as devices 141 and/or 151.

In one example implementation, computing device 100 may have a processor 103 for controlling the overall operation of the device 100 and its associated components, including RAM 105, ROM 107, an input/output (I/O) module 109, and memory 115. In one example, as will be apparent to those of ordinary skill in the art, memory 115 may comprise any known form of persistent and/or volatile memory, such as, among others, a hard disk drive, a solid-state disk, optical disk technologies (CD-ROM, DVD, Blu-ray, and the like), tape-based stored devices, ROM, and RAM, or combinations thereof. In this way, memory 115 may comprise a non-transitory computer-readable medium that may communicate instructions to processor 103 to be executed.

I/O module 109 may include a microphone or other audio input device, infrared sensor/transmitter, keypad, touch screen, button, and/or stylus through which a user of the computing device 100 may provide input, and may also include one or more of a speaker for providing audio output and/or a video display device for providing textual, audio-visual and/or graphical output. Software may be stored within memory 115 and/or storage to provide instructions to the processor 103 for allowing the computing device 100 to perform various functions. For example, memory 115 may store software used by the computing device 100, such as an operating system 117, application programs 119, and an associated database 121. The processor 103, and its associated components, may allow the computing device 100 to run a series of computer-readable instructions to process and format data.

The computing device 100 may further include one or more transmitters and/or receivers (TX/RX) 110 and a power supply 112, as illustrated in FIG. 1. The TX/RX 110 may be configured for wireless transmission and/or reception through one or more wireless communication channels (including but not limited to: WiFi®, Bluetooth®, Near-Field Communication (NFC), ZigBee, ANT technologies and/or other wireless communication techniques. In one embodiment, all communications with external devices may be done through the TX/RX 110. The TX/RX 110 may further include an antenna 113 as shown in FIG. 1. The power supply 112 may be connected to power any or all other components of the computing device 100 and may be rechargeable or removable/replaceable in one embodiment.

The computing device 100 may operate in a networked environment supporting connections to one or more remote computers, such as computing devices 141 and 151. In one example, the computing devices 141 and 151 may be personal computers or servers that include many, or all, of the elements described above relative to the computing device 100. Alternatively, computing device 141 and/or 151 may be a data store that is affected by the operation of the computing device 100. In some embodiments, the computing device 141 and/or 151 may be wireless access points, capable of wireless communications. The network connections depicted in FIG. 1 include a local area network (LAN) 125 and a wide area network (WAN) 129, but may also include other networks. When used in a LAN networking environment, the computing device 100 may be connected to the LAN 125 through a LAN interface 123. When used in a WAN networking environment, the computing device 100 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, and the like is presumed. Accordingly, communication between one or more of computing devices 100, 141, and/or 151 may be wired or wireless, and may utilize Wi-Fi, a cellular network, Bluetooth, ZigBee, infrared communication, or an Ethernet cable, among many others.

Additionally, an application program 119 used by the computing device 100, according to an illustrative embodiment of the disclosure, may include computer-executable instructions for invoking functionality as disclosed herein.

The computing device 100 and/or the other devices 141 or 151 may also be mobile devices, which may include various other components, such as a battery, speaker, and antennas (not shown).

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, multiprocessor systems, microprocessor-based systems, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices. In one embodiment, the computer device 100 may include computer-executable instructions for transmitting, receiving, processing, modifying, storing, converting, or otherwise taking action with respect to audio signals and to control/configuration signals.

Figure 2:
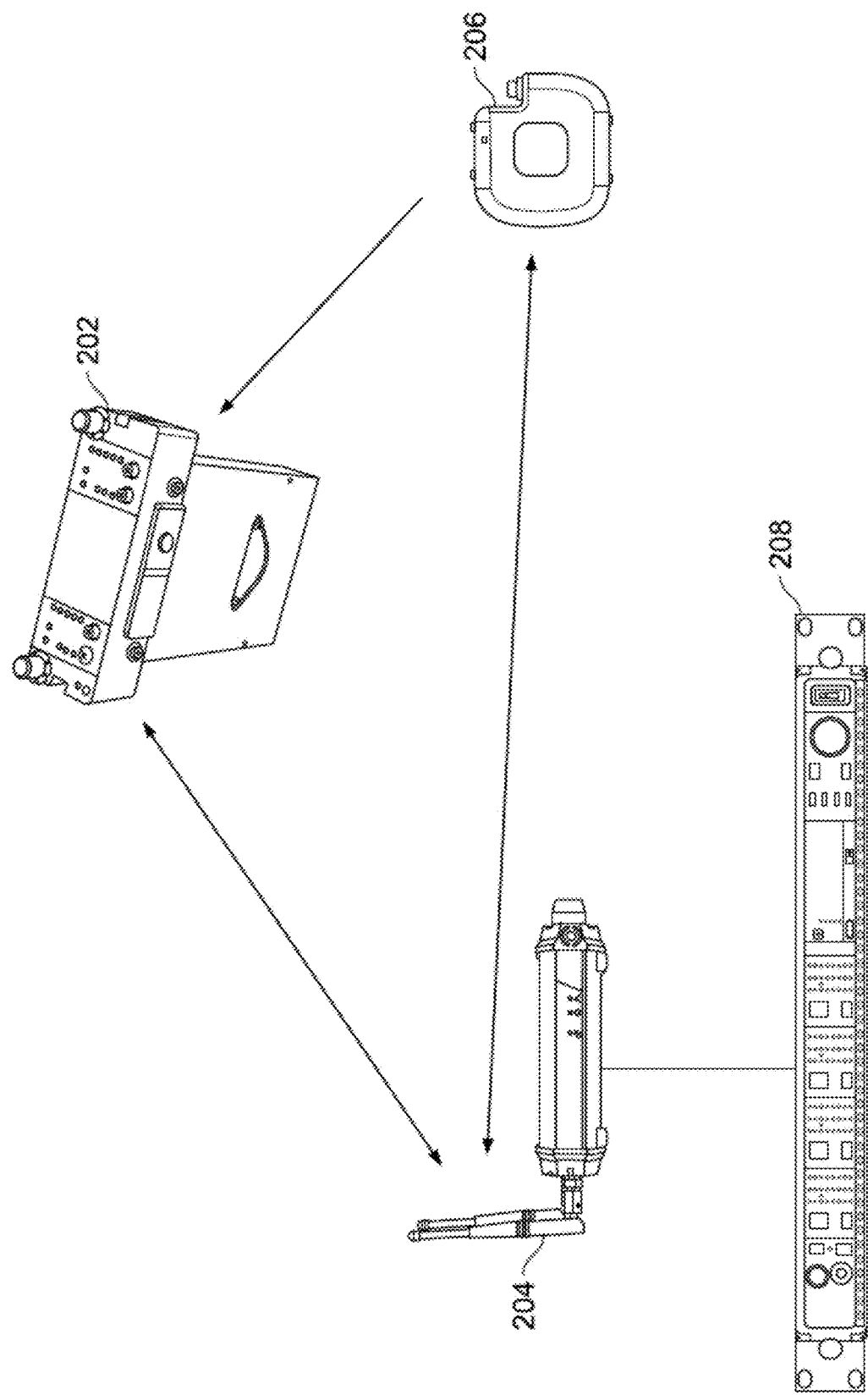
FIG. 2 shows an example communications interconnection of the controller and other devices, in accordance with aspects described herein.

FIG. 2 shows an example communications interconnection between a controller 202 and other devices, such as wireless access point 204 and wireless transceiver 206, in accordance with aspects described herein. Controller 202 may comprise a computing device 100 as shown in FIG. 1. In some embodiments, the controller 202 may be configured to receive digital audio from a wireless microphone or other wireless device, such as wireless transceiver 206. In some embodiments, controller 202 may include a battery, as discussed above, enabling it to be operational without a connection to external electric power. Controller 202 may receive audio signals directly from the wireless transceiver 206 via wireless radio frequency communications. In some embodiments, controller 202 may configure or otherwise control wireless transceiver 206 by sending commands via a bi-directional wireless connection with the wireless access point 204, which may subsequently send, for example by routing, the commands to wireless transceiver 206 via a second bi-directional wireless connection, as depicted in FIG. 2. In some embodiments, the commands received by the wireless access point 204 may be routed, via a wired connection, to another wireless access point 204, which may be in wireless communication with the wireless transceiver 206. Various parameters of wireless transceiver 206 may be configured, including frequency, gain, a muting state, a transmit power level, and device name, for example.

Also shown in FIG. 2 is a rack-mounted controller 208, which may perform similar functions as controller 202, but which communicates with the wireless access point 204 via a wired network connection, for example, over Ethernet.

In some embodiments, wireless transceiver 206 may comprise a wireless microphone, or may be a transceiver that is configured to be attached to, or in communication with, a microphone or speaker. In some embodiments, wireless transceiver 206 may communicate with wireless access point 204 using bi-directional wireless communications. In some embodiments, wireless transceiver 206 may transmit an encoded audio signal to controller 202 via unidirectional wireless communications.

In some embodiments, the bi-directional wireless communications may take place via a wireless network, which, in some embodiments, may be based on the ZigBee wireless standard. In some embodiments, the controller 202 and/or the wireless transceiver 206 may join this wireless network, in order to communicate with the wireless access point 204. When the controller 202 has joined the wireless network and is in communication with the wireless access point 204, the mode of operation of the controller 202 may be referred to as "network mode."

In some embodiments, in order for the controller 202 to join the wireless network, permission may be granted by a sponsor already on the network. For example, rack-mounted controller 208 may act as a sponsor to allow controller 202 to join the wireless network. In some embodiments, the sponsor may be a device, such as the rack-mounted controller 208, that has been pre-configured to store identifiers of devices it may sponsor.

In some other embodiments, an access control method may allow the controller 202 to join the wireless network, without need for the rack-mounted controller 208 to act as a sponsor.

Once on the wireless network, the controller 202 may, in some embodiments, become a sponsor itself, and grant permission for other devices to join the wireless network. For example, the controller 202 may grant permission to devices that have been previously registered with controller 202. In some embodiments, devices may be registered with the controller 202 via an infrared sensor/transmitter on the controller 202. The infrared sensor may be used to send/receive/sync an identifier associated with the device, the controller 202, or the wireless network. In other embodiments, devices may be registered with the controller 202 via manual input of device identifying information into the controller 202.

In some embodiments, the access control method may be used to allow additional devices, such as microphones and/or wireless transceivers to join the wireless network without first needing to register via infrared or via manual data entry.

Continuing the description of FIG. 2, the wireless access point 204 may create a one-to-many connection with a number of wireless devices, such as wireless transceiver 206, or wireless microphones.

In some embodiments, controller 202, operating in network mode, may transmit to wireless access point 204 using a low power mode, for example, in order to reduce the possibility of interfering with the reception of audio signals from the wireless transceiver 206. For example, a level of a received audio signal may be determined and the controller 202 may use a low power mode if the level of the received audio signal is below a predetermined level.

Figure 3:
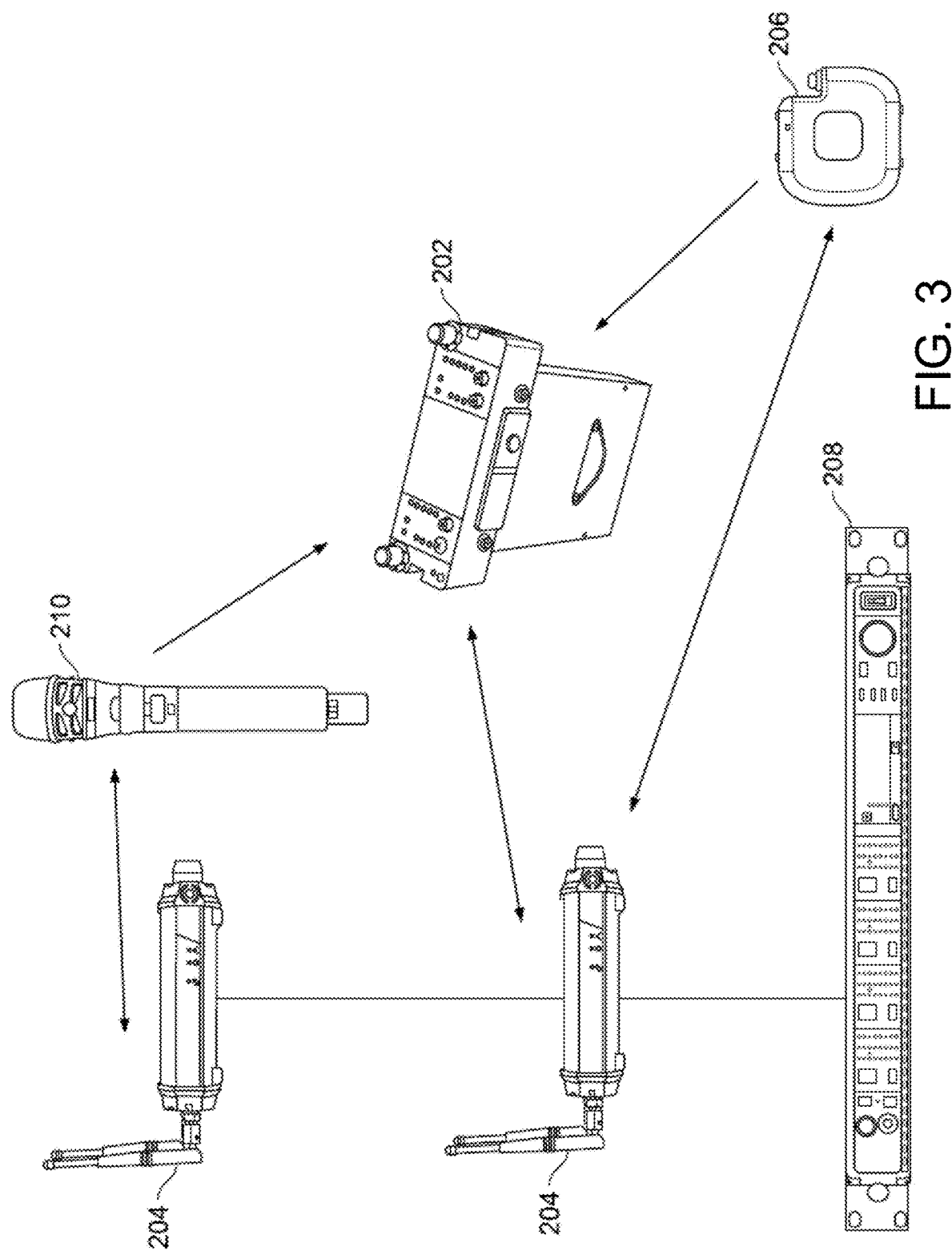
FIG. 3 shows another example communications interconnection of the controller with other devices, in accordance with aspects described herein.

In some embodiments, as shown in FIG. 3, additional wireless access points 204 may be added to the network, in order to increase the size of the area covered, to increase capacity (for example, each wireless access point 204 may be able to communicate with a limited number of devices), to decrease sensitivity to interference (overlapping coverage areas may use different channels, and if RF (radio frequency) noise impairs a channel, the devices may associate with a wireless access point 204 on a different channel), and/or to increase available bandwidth (for example, each wireless access point 204 may support a finite amount of data throughput, and by adding more wireless access points 204, devices may be distributed among the wireless access points 204, and therefore increase the percentage of available bandwidth in each wireless access point 204). For example, in FIG. 3, wireless microphone 210 and wireless transceiver 206 are depicted as communicating with different wireless access points 204.

Figure 4:
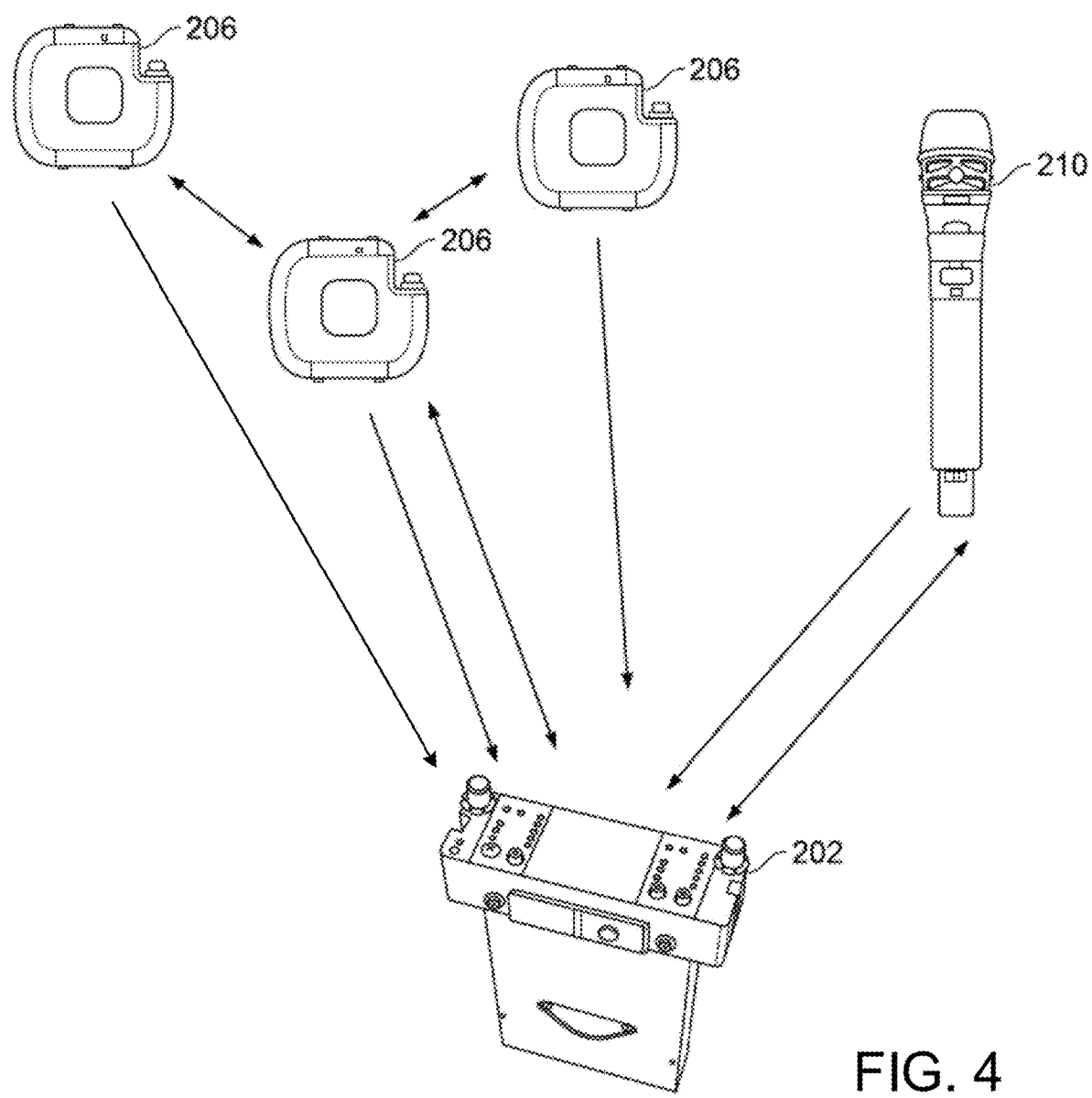
FIG. 4 shows an example communications interconnection of the controller in direct communications with other devices, in accordance with aspects described herein.

FIG. 4 shows an example of the controller 202 in direct bi-directional communications with other devices, in accordance with aspects described herein. The controller 202 in FIG. 4, is operating in what may be referred to as "direct mode," in which the wireless transceivers 206 and wireless microphone 210 communicate directly with the controller 202 for bi-direction wireless communications, for example, for control and/or configuration. In these embodiments, the controller 202 may have its own network identifier (ID), which may be used for network access as discussed below. A benefit of the direct mode is that a wireless access point 204 is not required, and, since the controller 202 can act as a sponsor as described above and a coordinator of the network, no other sponsor/coordinator device is needed. In some embodiments, wireless communications in the "direct mode" may be based on the ZigBee standard. The controller 202 in FIG. 4 is depicted as also receiving audio signals from the wireless transceivers 206 and from the wireless microphone 210 via unidirectional RF communications.

In some embodiments, controller 202 may transmit to the wireless transceivers 206 and/or the wireless microphone 210 using a low power mode, for example, in order to reduce the possibility of interfering with reception of the audio signals from the wireless transceivers 206 and/or the wireless microphone 210.

In some embodiments, a mesh network of wireless transceivers 206 and/or wireless microphones 210 may be used to increase the coverage area and reliability of wireless communications. For example, one or more of the wireless transceivers 206 and/or the wireless microphone 210 may directly communicate with each other, in order to route or forward commands and/or configuration information to devices that are not in direct communication with controller 202. In some embodiments, the mesh network may be based on the ZigBee standard.

In some embodiments, a controller 202 may automatically switch between direct mode and network mode. For example, the controller 202 may automatically switch to direct mode when network mode connectivity between the controller 202 and a wireless access point 204 is lost or is otherwise not available. In these embodiments, when the controller 202 loses the connection with the wireless network, the wireless transceivers 206 and/or the wireless microphone 210 that it sponsored may also leave the wireless network and begin a search for another network to join. When the controller 202 switches to direct mode, the wireless transceivers 206 and/or microphone 210 may discover and join the direct mode network and achieve network connectivity with the controller 202.

In some embodiments where the controller 202 may have the ability to transition between network mode and direct mode, the controller 202 may operate as a client or as a master, depending on the embodiment, and may switch between these roles. In some embodiments, the controller 202 may be manually set to stay in network mode or direct mode, for example, through user configuration/input.

The controller 202 may transition between modes for, or during, communications with any particular wireless transceiver 206. For example, the controller 202 may begin communicating with a wireless transceiver 206 via the wireless access point 204 and then switch to communicating with the wireless transceiver 206 directly. This may be beneficial, for example, if the wireless transceiver 206 moves closer to the controller 202, such that communications can be carried out using low power mode, or such that communications becomes more reliable in direct mode than in network mode.

Figure 5:
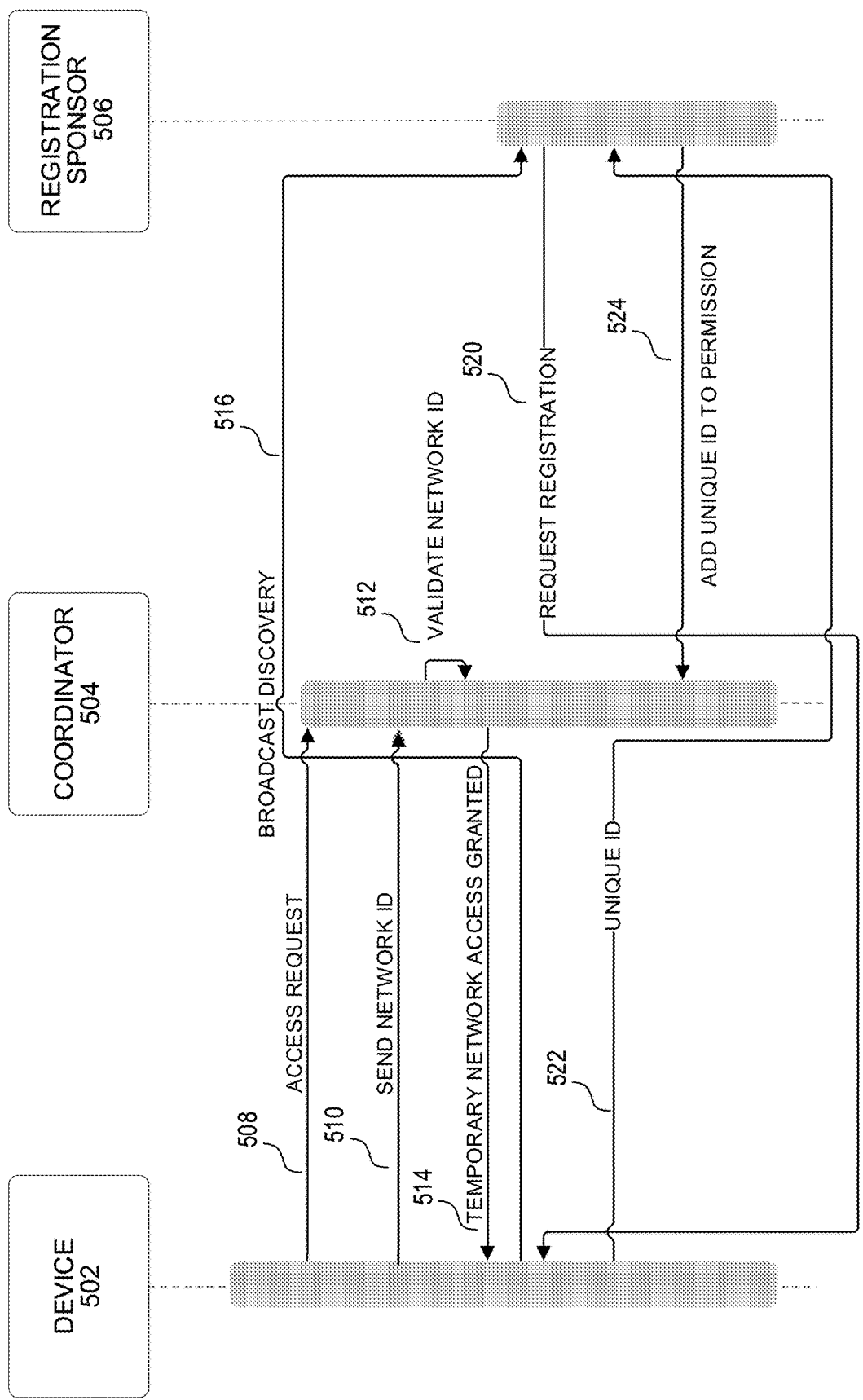
FIG. 5 shows communications for allowing a device to join a wireless network, in accordance with aspects described herein.

FIG. 5 shows communications for enabling an unregistered device to join a wireless network, in accordance with aspects described herein.

In some embodiments, unregistered devices, for example, "spare" devices, may be allowed temporary access to a wireless network. During a period of temporary access, the device may become registered, as further discussed below. In some embodiments, a unique network ID may be configured in the controller 202. The same network ID may be set in a spare device, such as in a spare wireless transceiver 206 or wireless microphone 210. For example, the network ID may be manually entered into the spare device or may be synched to the device via infrared, as discussed above. The spare device may wirelessly scan for available controllers 202. When the network ID in the device matches the network ID stored in a controller 202, the spare device may be granted temporary permission, by the controller 202, to join the wireless network. Once on the wireless network, the spare device may be registered to a sponsor. In some embodiments, the sponsor may add the spare device to a permission list in one or more controllers 202 so that the device may become a registered member of the network, which may also be referred to as becoming a "registered" device.

Referring to FIG. 5, at step 508, the device 502 (for example, the "spare") may send a request for network access to coordinator 504. At step 510, the device may provide a network ID to the coordinator 504. At step 512, the coordinator 504 may validate the network ID, for example, to confirm that the network ID matches a network ID stored within the coordinator 504 (e.g. preconfigured in the coordinator). If the network ID matches, at step 514, the coordinator 504 may communicate with the device 502 to grant temporary network access. In some embodiments, the temporary network access may expire after a pre-determined period. For example, the coordinator 504 may store an identifier of the device 502 and an associated expiration time in an access control list in order to allow the device 502 with temporary network access.

At step 516, the device 502 may broadcast a discovery message on the network, which may be received by registration sponsor 506. Upon receiving the discovery message, the registration sponsor 506 may, at step 520, send a request to the device 502 requesting registration information. Next, at step 522, device 502 may send a unique ID to the registration sponsor 506. After receiving the unique ID, the registration sponsor 506 may, at step 524, communicate with the coordinator 504 to cause the coordinator to add the unique ID to an internal permission list (e.g. an access control list), thereby allowing the device 502 to become a registered member on the network.

In various embodiments, device 502 in FIG. 5 may be any of wireless transceiver 206, wireless microphone 210, and/or controller 202 (operating in network mode). In these embodiments, rack-mounted controller 208 (shown in FIGS. 2-3) may operate as the registration sponsor 506 and the wireless access point 204 may act as the coordinator 504. In these embodiments, the controller 202 may be said to operate as a client on the wireless network.

In various other embodiments, controller 202 (in direct mode) may operate as the registration sponsor 506 and as the coordinator 504 in FIG. 5. In these embodiments, any of wireless transceiver 206 and/or wireless microphone 210, may operate as device 502. In these embodiments, the controller 202 may be said to operate as a master.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method of controlling a wireless transceiver, the method comprising:
   switching, by a controller, between at least two modes of the controller, wherein the at least two modes of the controller comprise a first mode and a second mode;
   communicating with the wireless transceiver during a time period, by the controller using a first wireless protocol with a first power mode, wherein the communicating comprises:
      in the first mode, communicating directly with the wireless transceiver; and
      in the second mode, communicating with the wireless transceiver via a wireless access point; and
   receiving an audio signal from the wireless transceiver during the time period, by the controller using a second wireless protocol with a second power mode that is different from the first wireless protocol with the first power mode, wherein the receiving comprises:
      in the first mode, receiving the audio signal directly from the wireless transceiver; and
      in the second mode, receiving the audio signal from the wireless transceiver via the wireless access point.

2. The method of claim 1, wherein:
   the first power mode is associated with a first power level;
   the second power mode is associated with a second power level; and
   the first power level is lower than the second power level.

3. The method of claim 1, further comprising:
   while in the second mode, determining, by the controller, that the communicating with the wireless transceiver via the wireless access point is no longer available; and
   based on the determining, switching to the first mode.

4. The method of claim 1, wherein the communicating with the wireless transceiver comprises controlling a configuration of the wireless transceiver.

5. The method of claim 4, wherein controlling the configuration of the wireless transceiver comprises controlling at least one of: a frequency, a gain, a muting state, a transmit power level, or a device name associated with the wireless transceiver.

6. The method of claim 1, wherein the communicating with the wireless transceiver by the controller comprises communicating in the second mode, and the receiving the audio signal from the wireless transceiver comprises communicating in the first mode.

7. The method of claim 1, wherein the first mode is a direct mode and the second mode is a network mode.

8. A controller comprising:
   a processor; and
   a memory unit storing computer-executable instructions that, when executed by the processor, cause the controller to:
      switch between at least two modes of the controller, wherein the at least two modes of the controller comprise a first mode and a second mode;
      communicate with a wireless transceiver during a time period and using a first wireless protocol with a first power mode, wherein:
         the controller is configured to directly communicate with the wireless transceiver in the first mode, and
         the controller is configured to communicate with the wireless transceiver via a wireless access point in the second mode; and
      receive an audio signal from the wireless transceiver during the time period and using a second wireless protocol with a second power mode that is different from the first wireless protocol with the first power mode, wherein:
         the controller is configured to receive the audio signal directly from the wireless transceiver in the first mode, and
         the controller is configured to receive the audio signal from the wireless transceiver via the wireless access point in the second mode.

9. The controller of claim 8, wherein:
   the first power mode is associated with a first power level;
   the second power mode is associated with a second power level; and the first power level is lower than the second power level.

10. The controller of claim 8, wherein the instructions, when executed by the processor, further cause the controller to be configured to:
   determine, while in the second mode, that communication with the wireless transceiver via the wireless access point is no longer available; and
   based on the determine that communication with the wireless transceiver via the wireless access point is no longer available, switch to the first mode.

11. The controller of claim 8, wherein the instructions, when executed by the processor, further cause the controller to be configured to communicate with the wireless transceiver using the first wireless protocol to define a configuration of the wireless transceiver.

12. The controller of claim 11, wherein the configuration comprises at least one of: a frequency, a gain, a muting state, a transmit power level, or a device name associated with the wireless transceiver.

13. The controller of claim 8, wherein the instructions, when executed by the processor, further cause the controller to be configured to communicate with the wireless transceiver in the second mode, and to receive the audio signal from the wireless transceiver in the first mode.

14. The controller of claim 8, wherein the first power mode is a low power mode.

15. A system comprising:
   at least one wireless transceiver comprising:
      a first processor; and
      a first memory unit storing first computer-executable instructions that, when executed by the first processor, cause the at least one wireless transceiver to send an audio signal using a first wireless protocol with a first power mode; and
   a controller comprising:
      a second processor; and
      a second memory unit storing second computer-executable instructions that, when executed by the second processor, cause the controller to:
         switch between at least two modes of the controller, wherein the at least two modes of the controller comprise a first mode and a second mode;
         communicate with the at least one wireless transceiver during a time period and using a second wireless protocol with a second power mode that is different from the first wireless protocol with the first power mode, wherein:
            the controller is configured to directly communicate with the wireless transceiver in the first mode, and
            the controller is configured to communicate with the at least one wireless transceiver via a wireless access point in the second mode; and
         receive the audio signal from the at least one wireless transceiver during the time period and using the first wireless protocol, wherein:
            the controller is configured to receive the audio signal directly from the at least one wireless transceiver in the first mode, and
            the controller is configured to receive the audio signal from the at least one wireless transceiver via the wireless access point in the second mode.

16. The system of claim 15, wherein:
   the first power mode is associated with a signal that has a first power level;
   the second power mode is associated with a signal that has a second power level; and
   the second power level is lower than the first power level.

17. The system of claim 15, wherein the second computer-executable instructions, when executed by the second processor, further cause the controller to be configured to:
   determine, while in the second mode, that communication with the at least one wireless transceiver via the wireless access point is no longer available; and
   switch to the first mode.

18. The system of claim 15, wherein the second computer-executable instructions, when executed by the second processor, further cause the controller to be configured to communicate with the at least one wireless transceiver using the first wireless protocol to define a configuration of the at least one wireless transceiver.

19. The system of claim 18, wherein the configuration comprises at least one of: a frequency, a gain, a muting state, a transmit power level, or a device name associated with the at least one wireless transceiver.

20. The system of claim 15, wherein the at least one wireless transceiver comprises two wireless microphones and one wireless transceiver.

* * * * *